United States Patent
Park et al.

(10) Patent No.: US 9,585,149 B1
(45) Date of Patent: Feb. 28, 2017

(54) METHOD AND SYSTEM FOR SELECTING DUPLEX MODE OF SECOND RF CARRIER BASED ON PERFORMANCE ON FIRST RF CARRIER

(71) Applicant: Sprint Spectrum L.P., Overland Park, KS (US)

(72) Inventors: Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 103 days.

(21) Appl. No.: 14/706,709

(22) Filed: May 7, 2015

(51) Int. Cl.
*H04W 72/04* (2009.01)
*H04L 5/14* (2006.01)

(52) U.S. Cl.
CPC ....... *H04W 72/0453* (2013.01); *H04L 5/1438* (2013.01); *H04W 72/0406* (2013.01)

(58) Field of Classification Search
None
See application file for complete search history.

(56) References Cited

U.S. PATENT DOCUMENTS

| 7,248,567 B2 * | 7/2007 | Desgagne | H04W 72/04 370/277 |
| 2008/0233955 A1 | 9/2008 | Narang et al. | |
| 2014/0086081 A1 * | 3/2014 | Mack | H04L 5/006 370/252 |
| 2015/0055519 A1 * | 2/2015 | Lin | H04L 1/1607 370/280 |
| 2015/0124665 A1 * | 5/2015 | Park | H04B 7/0634 370/280 |
| 2015/0146585 A1 * | 5/2015 | Rashid | H04L 5/0032 370/278 |
| 2015/0163815 A1 * | 6/2015 | Lei | H04W 16/10 370/280 |
| 2015/0341945 A1 * | 11/2015 | Panchal | H04L 5/003 370/329 |
| 2015/0382207 A1 * | 12/2015 | Dimou | H04L 5/14 370/280 |
| 2016/0218850 A1 * | 7/2016 | Gross | H04L 5/006 |

FOREIGN PATENT DOCUMENTS

WO    WO 2013/067030    10/2013

* cited by examiner

*Primary Examiner* — Andrew Oh

(57) ABSTRACT

When a base station is serving a UE on a first RF carrier, the base station encounters a trigger to add to the UE's air interface connection a second RF carrier. The base station then decides based at least in part on a measure of RF performance of communication between the base station and the UE on the first RF carrier, whether the second RF carrier that the base station will add to the UE's air interface connection should be a TDD carrier or rather an FDD carrier. And the base station then reconfigures the UE's air interface connection to add a second RF carrier in accordance with the decision. The base station then serves the UE concurrently on the first RF carrier and the second RF carrier.

10 Claims, 4 Drawing Sheets

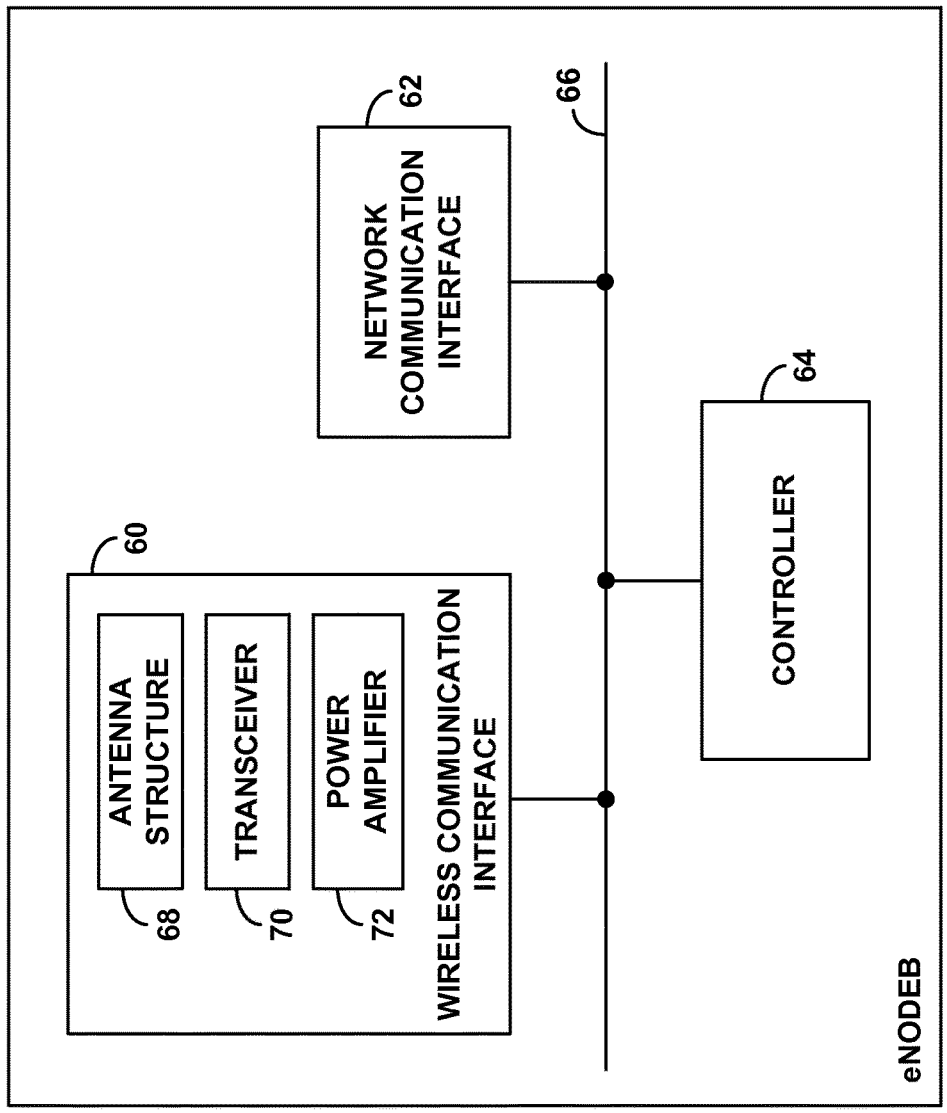

METHOD AND SYSTEM FOR SELECTING DUPLEX MODE OF SECOND RF CARRIER BASED ON PERFORMANCE ON FIRST RF CARRIER

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more radio frequency (RF) carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as a pair of separate respective ranges of frequency, or time division duplex (TDD), in which the downlink and uplink channels are defined on a common range of frequency but distinguished from each other through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot or sub-frame into resource blocks. When a UE is positioned within coverage of a base station in such a system, the UE may register or "attach" with the base station on a particular carrier on which the base station is configured to provide, and the base station may then serve the UE on that carrier, scheduling particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such an LTE system, for instance, when the base station has data to transmit to a UE, the base station may assign certain downlink resource blocks (and thus certain sub-carriers) in a given sub-frame for use to carry the data to the UE at a particular coding rate, and the base station may then (i) transmit to the UE in that sub-frame a downlink control information (DCI) message that specifies the assigned resource blocks and coding rate and (ii) encode and transmit the data to the UE in the assigned resource blocks in that sub-frame. Per the DCI message, the UE would then read the transmitted data from the assigned resource blocks. Likewise, when the UE has data to transmit to the base station and accordingly transmits a scheduling request to the base station, the base station may assign certain uplink resource blocks in a given sub-frame for use to carry the data from the UE at a particular coding rate and may transmit to the UE, in advance of that sub-frame, a DCI message that specifies the assigned resource blocks and coding rate. And the UE may then encode and transmit the data to the base station in the assigned resource blocks in that sub-frame.

With such an arrangement, the bandwidth of the carrier on which the base station serves a UE may pose an effective limit on the peak rate of data communication between the base station and the UE, as the bandwidth would define only a limited number of resource blocks per slot or sub-frame, with data rate per resource block being further limited based on air interface conditions.

One way to help overcome this per-carrier data rate limitation is to have a base station serve a UE on multiple carriers at once, providing what is known as "carrier aggregation" service. With carrier aggregation service, multiple carriers from either contiguous frequency bands or non-contiguous frequency bands are aggregated together as "component carriers" to increase the overall bandwidth available per slot by providing a greater extent of air interface resources in which the base station can schedule uplink and downlink communication.

With carrier aggregation, one of the carriers may be deemed a primary component carrier or primary cell (PCell) on which the base station serves the UE, and each other carrier may be deemed to be a secondary component carrier or secondary cell (SCell) on which the base station serves the UE. In particular, the PCell may be the carrier on which the UE is attached with the serving base station and may thus carry control signaling (such as scheduling requests and DCI messages) between the base station and the UE, in addition to carrying scheduled data transmissions between the base station and the UE. Each added SCell may then function to increase the total bandwidth on which the base station serves the UE with scheduled data transmissions.

Thus, in an example arrangement, if a base station is serving a UE with carrier aggregation on a PCell and one SCell, the base station may assign to the UE in a given sub-frame certain downlink resource blocks on the PCell and certain downlink resource blocks on the SCell, and the base station may (i) transmit to the UE in that sub-frame on the PCell a DCI message that specifies all of those assigned resource blocks and (ii) encode and transmit the data to the UE in the assigned resource blocks on the PCell and SCell. Likewise, when the UE has data to transmit to the base station and transmits a scheduling request to the base station, the base station may assign in a given sub-frame certain uplink resource blocks on the PCell and certain uplink resource blocks on the SCell and may transmit to the UE on the PCell, in advance of that sub-frame, a DCI message that specifies all of those assigned resource blocks. The UE may then encode and transmit the data to the base station in the assigned resource blocks on the PCell and SCell. (In an alternative arrangement, the base station may make use of the SCell just for its added downlink bandwidth, not for its added uplink bandwidth, thus effectively providing just downlink carrier aggregation.)

Overview

When a base station is serving a UE on one or more carriers, the base station may encounter a trigger scenario where it would be useful for the base station to add an additional carrier to its service of the UE. For instance, if the determines that a particular type of content will be communicated between the base station and the UE (e.g., content that is latency sensitive and/or that is a substantial) and perhaps if the current serving carrier is threshold heavily loaded, the base station may decide that it would be useful to add another carrier to its service of the UE so as to help increase the peak data rate available for the UE. If the base station is currently serving the UE on just one carrier, this may be a decision that it would be useful to begin providing the UE with carrier aggregation service on that carrier (e.g., as PCell) together with another carrier (e.g., as SCell). Or if the base station is already providing the UE with carrier aggregation service, this may a decision that it would be useful to add another carrier (e.g., another SCell) to the base station's service of the UE.

Once a base station has decided to add another carrier to its service of the UE, at issue may then be which of possibly multiple carriers the base station should add. For instance, assuming the base station is configured to operate on three carriers, A, B, and C, and the base station is currently serving the UE on carrier A, at issue may be whether the base station should add to its service of the UE carrier B or rather carrier C.

The present disclosure specifically addresses the question of whether the carrier that the base station will add to its service of the UE should be a TDD carrier or an FDD carrier. Thus, the disclosure can apply in a scenario where the base station is serving the UE on at least one carrier and also is configured to operate on at least two other carriers on which the base station is not currently serving the UE, including at least one TDD carrier and at least one FDD carrier. In that scenario, when the base station decides to add another carrier to its service of the UE, at issue is which duplex-mode carrier the base station should select to add, and, namely, whether the base station should add a TDD carrier or rather an FDD carrier.

In accordance with the disclosure, the base station will resolve this issue based at least in part on a consideration of RF performance (e.g., signal strength, signal to noise ratio, or the like) of communication between the base station and the UE on a carrier on which the base station is currently serving the UE. For instance, if the base station is currently serving the UE on just one carrier, the base station may determine a measure of RF performance of communication between the base station and the UE on that one carrier, and based on that determined measure of RF performance, the base station may then decide whether the carrier that the base station will add to its service of the UE should be an FDD carrier or rather a TDD carrier.

In an example implementation, the carrier on which the base station is currently serving the UE may be a TDD carrier, and (i) if the determined RF performance on that TDD carrier is threshold poor, then the base station may responsively select an FDD carrier to add to its service of the UE but (ii) if the determined RF performance on that TDD carrier is not threshold poor, then the base station may responsively select a TDD carrier to add to its service of the UE. Further, the base station may also take into consideration other factors in selecting between adding an FDD carrier or adding a TDD carrier. For instance, if the determined RF performance on the currently used TDD carrier is threshold poor, the base station may condition its decision to add an FDD carrier on a projected path loss of the FDD carrier being threshold less than path loss on the current TDD carrier; and if the projected path loss on the FDD carrier is not threshold less than path loss on the current TDD carrier, then the base station may instead decide to add another TDD carrier to its service of the UE. Other considerations are possible as well.

Accordingly, in one respect, disclosed is a method of managing communication between a base station and a UE in a wireless communication system wherein RF carriers are each either TDD or FDD. In accordance with the disclosure, the method involves the base station initially serving the UE on just a first RF carrier. While serving the UE on just the first RF carrier, the base station then makes a decision to begin providing the UE with carrier aggregation service on multiple RF carriers including the first RF carrier and a second RF carrier. In response to that first decision, (a) the base station then makes a second decision, based at least in part on a measure of RF performance of communication between the base station and the UE on the first RF carrier, of whether to select as the second RF carrier a TDD carrier or rather an FDD carrier, (b) the base station selects an RF carrier to be the second RF carrier in accordance with the second decision, and (c) the base station begins to serve the UE with carrier aggregation service on the first RF carrier and the selected second RF carrier.

Further, in another respect, disclosed is a method of managing communication between a base station and a UE. In accordance with the disclosure, the method involves the base station initially serving the UE over an air interface connection between the base station and the UE, where the air interface connection encompasses at least a first RF carrier. While serving the UE over the air interface connection on at least the first RF carrier, the base station then encounters a trigger to add a second RF carrier to the air interface connection. And in response to encountering that trigger, (i) the base station determines a channel condition of the air interface connection on the first RF carrier, (ii) based at least on the determined channel condition of the air interface connection on the first RF carrier, the base station makes a decision of whether the second RF carrier to add to the air interface connection should be a TDD carrier or rather an FDD carrier, and (iii) the base station reconfigures the air interface connection to add the second RF carrier in accordance with the decision. In this manner, the base station then serves the UE over the air interface connection concurrently on at least the first RF carrier and the second RF carrier.

Still further, in yet another respect, disclosed is a base station that includes a wireless communication interface for serving a UE over an air interface, and a controller for managing communication between the base station and the UE. In accordance with the disclosure, the controller is thus configured to carry out various operations. For instance, while the base station is serving the UE on just a first RF carrier, the controller may make a first decision to begin providing the UE with carrier aggregation service on a plurality of RF carriers including the first RF carrier and a second RF carrier. And in response to the first decision, the controller may (a) make a second decision, based at least in part on a measure of RF performance of communication between the base station and the UE on the first RF carrier, of whether to select as the second RF carrier a TDD carrier or rather an FDD carrier, (b) select an RF carrier to be the second RF carrier in accordance with the second decision, and (c) cause the base station to begin serving the UE with carrier aggregation service on the first RF carrier and the selected second RF carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 4 is a simplified block diagram of an example base station operable in accordance with the disclosure.

DETAILED DESCRIPTION

The present method and apparatus will be described herein mainly in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
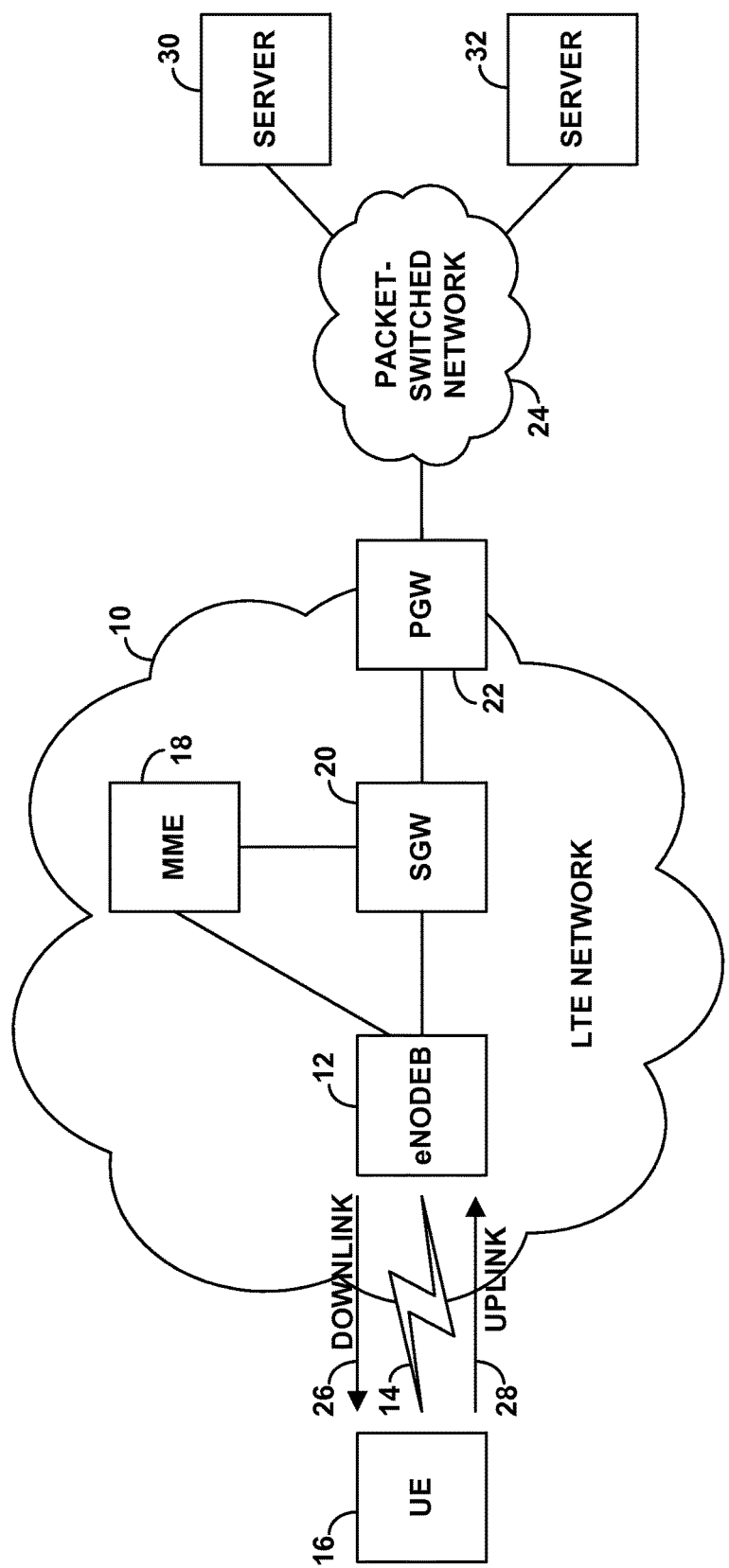
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UE may be configured (e.g., licensed and programmed) to support air interface communication on various particular carriers, each of which may be FDD or TDD. Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect the eNodeB's coverage on a particular carrier, and the UE may engage in an attach process or handover process to register with the LTE network on that carrier. For instance, the UE may initially transmit to the eNodeB an attach request, which the eNodeB may pass along to the MME 18, triggering a process of authenticating the UE and establishment of one or more logical bearer connections for the UE between the eNodeB and the PGW 22.

Further, the UE may engage in signaling with the eNodeB to establish a radio-link-layer connection (i.e., air interface connection) on the detected carrier, so that the eNodeB may then serve the UE on that carrier. For instance, the UE and eNodeB may exchange radio resource control (RRC) configuration messaging in order to prepare the eNodeB to serve the UE on the carrier and to prepare the UE to be served on the carrier. In this process, the eNodeB may store a context record for the UE, indicating that the eNodeB is serving the UE on the particular carrier, so that the eNodeB may then serve the UE on the indicated carrier (e.g., then exchanging control signaling and bearer traffic with the UE on that carrier) per that context record. Further, the UE may store a context record indicating that the UE is being served on that carrier, so that the UE can then be served on that carrier (e.g., then exchanging control signaling and bearer traffic with the eNodeB on that carrier) per that context record. As such, the radio-link-layer connection could be considered to effectively encompass initially just that one carrier.

In addition, during this initial attach process and/or more likely later while serving the UE, the eNodeB and UE may engage in RRC configuration messaging and/or other processing to modify or otherwise set the UE's radio-link-layer connection to encompass a different number of carriers. In particular, the eNodeB and UE may arrange the UE's radio-link-layer connection to encompass two or more carriers so as to facilitate carrier aggregation service.

There could be various reasons or triggers for doing this. By way of example, the eNodeB may determine that a single carrier on which the UE would be served or is being served, such as the carrier on which the UE initially requested attachment and/or initially attached with the eNodeB, is threshold heavily loaded (e.g., that the eNodeB has been scheduling more than a threshold percentage of resources on that carrier, and/or that the eNodeB is serving more than a threshold number of UEs with radio-link-layer connections encompassing that carrier). Or the eNodeB may determine that the air interface channel conditions between the UE and the eNodeB are threshold good and/or threshold poor (e.g., based on UE-provided channel-quality measurement reports and/or eNodeB evaluation of channel quality). Still further, the eNodeB may determine that there is a threshold great extent of data buffered for transmission over the air interface between the eNodeB and the UE. And still further, the eNodeB may determine that a particular type of content is going to be communicated between the eNodeB and the UE and that the type of content could benefit from added bandwidth.

To set or adjust the carriers encompassed by the UE's radio-link-layer connection, the eNodeB may transmit to the UE an RRC connection reconfiguration message that specifies the carriers on which the eNodeB will be serving the UE, identifying each carrier by its global identifier for instance. Further, to facilitate carrier aggregation service, the eNodeB may designate one such carrier by a special PCell index number (such as carrier index 0 (zero)) and the eNodeB may designate each other carrier by a special SCell index number (such as carrier index 1-7). The eNodeB may then also update its context record for the UE to indicate that the UE's radio-link-layer connection now encompasses the indicated carriers, so that the eNodeB may then engage in communication with the UE on those carriers. And the UE may responsively update its context record to indicate that the UE's radio-link-layer connection now encompasses the indicated carriers, so that the UE will be prepared to engage in communication with the eNodeB on those carriers.

This or another process could be used to add or remove one or more carriers from a UE's radio-link-layer connection and to thus reconfigure the radio-link-layer connection. For example, if the connection currently encompasses just one carrier, the process could be used to reconfigure the connection to encompass a different carrier and/or to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

In line with the discussion above, the present disclosure can address a scenario where an eNodeB is serving UE over an RRC connection that encompasses at least a first carrier, where the eNodeB decides to add another carrier to the UE's RRC connection, and where the eNodeB has a choice of whether to add a TDD carrier or rather an FDD carrier. As such, the eNodeB may be configured to operate on multiple carriers and may be currently serving the UE on one or more of those carriers, leaving at least one TDD carrier and at least one FDD carrier available to add to the UE's RRC connection. As discussed above, once the eNodeB encounters a trigger to add a carrier to the UE's RRC connection, the eNodeB will decide, based on RF performance of a carrier currently in the UE's RRC connection, whether the added carrier should be a TDD carrier or rather an FDD carrier.

Government regulations establish certain FDD LTE frequency bands and certain TDD LTE frequency bands, and wireless service providers may be licensed to operate on particular ones of those bands. Each FDD LTE frequency band defines a pair of discrete uplink and downlink frequency ranges, each of which can be divided into channels having bandwidths such as 1.4 MHz, 3 MHz, 5 MHz, 15 MHz, or 20 MHz. A wireless service provider licensed to use an FDD LTE band may then configure an eNodeB to operate on an FDD LTE carrier defined as a pair of such channels, such as particular a 5 MHz uplink channel and a particular 5 MHz downlink channel for example. Each TDD LTE frequency band, on the other hand, defines a single range of frequency, which can similarly be divided into channels having bandwidths such as those noted above. A wireless service provider licensed to use a TDD LTE band may then configure an eNodeB to operate on a TDD LTE carrier defined as a particular channel in that band, with uplink and downlink communications being time division multiplexed on that channel.

In a representative implementation of the present disclosure, a wireless service provider that operates eNodeB 12 may be licensed to operate on multiple LTE frequency bands, including one or more FDD LTE bands and one or more TDD LTE bands, and thus to provide service on multiple FDD LTE carriers and multiple TDD LTE carriers. With such an arrangement, the FDD carriers may be close in frequency to each other, the TDD carriers may be close in frequency to each other, and the FDD carriers may be distant in frequency from the TDD carriers. For example, but without limitation, the wireless service provider may be licensed to operate on FDD bands around 800 MHz or 1.9 GHz and on a TDD band around 2.5 GHz, in which case eNodeB 12 may be configured to operate on one or more FDD carriers around 800 MHz or 1.9 GHz and on one or more TDD carriers around 2.5 GHz.

In practice, the eNodeB may be initially serving UE 16 on at least one carrier (e.g., a sole serving carrier, or a PCell aggregated with one or more SCells), and when the eNodeB encounters a trigger to add a carrier to the UE's RRC connection, the eNodeB may have the option of adding, as the additional carrier, either a TDD carrier or an FDD carrier. For sake of discussion, the remainder of this disclosure will assume that the carrier on which the eNodeB is currently serving the UE is a TDD carrier in the 2.5 GHz band, and that the other carriers available for the eNodeB to add to the UE's connection include another TDD carrier in the 2.5 GHz band and an FDD carrier in the 800 MHz band or 1.9 GHz band. Further, the disclosure will assume that each TDD carrier is 20 MHz wide and that each FDD uplink and downlink channel is 5 MHz wide. However, principles of this disclosure can extend to apply in other scenarios as well, such as where the eNodeB is initially serving the UE on an FDD carrier and/or where the carriers are in bands other than these, whether the carriers are close to each other in frequency or distant from each other in frequency, and where the carriers have different bandwidths than these.

When the eNodeB is serving a the UE a given carrier such the TDD carrier in the example arrangement, and the eNodeB encounters a trigger to add another carrier to the UE's RRC connection, the eNodeB may then decide which duplex-mode carrier to add, based on a consideration of RF performance on the serving carrier.

In the example arrangement, for instance, the eNodeB may determine RF performance of communication between the eNodeB and the UE on the serving TDD carrier and, based at least in part on that determined RF performance, may select between adding another TDD carrier or rather adding an FDD carrier. If the UE is at the cell edge and thus in poor RF conditions on the serving TDD carrier, then the eNodeB may decide to add an FDD carrier, as the FDD carrier in the example arrangement would be at a lower frequency and therefore likely have much less path loss than the serving TDD carrier. On the other hand, if the UE is closer to the eNodeB and thus likely in better RF conditions on serving TDD carrier, then the eNodeB may decide to add another TDD carrier, as an added TDD carrier in the example arrangement would have larger bandwidth than an added FDD carrier.

Further, in the scenario where the eNodeB decides, based on poor RF performance on the serving TDD carrier, to add an FDD carrier, the eNodeB could condition that decision on a projection that the UE's path loss on the FDD carrier would not be too substantial. For instance, the eNodeB could project (estimate) the UE's path loss on the FDD carrier based on a measure of the UE's path loss on the serving TDD carrier, given the difference in frequencies between the serving TDD carrier and the FDD carrier. For instance, the eNodeB may first determine the path loss on the serving TDD carrier as the difference between the eNodeB's transmission reference signal power and the reference signal receive power reported by the UE to the eNodeB. And the eNodeB may apply a standard propagation model based on lambda and distance, where lambda is related to the carrier frequency (e.g., lambda=c/f, where c=3×10^8 m/s, and where f=1900×10^6 Hz for an FDD carrier at 1.9 MHz) or 2500×10^6 Hz for a TDD carrier at 2.5 GHz) and distance is determined by UE location estimated based on path loss on the serving TDD carrier, to project path loss on the FDD carrier. The eNodeB may then determine if the projected path loss is sufficiently less than the path loss on the TDD carrier and (i) if so, then proceed with the decision for the added carrier to be the FDD carrier but (ii) if not, then instead decide to add a TDD carrier, which in the example arrangement would have larger bandwidth than the FDD carrier.

Figure 2:
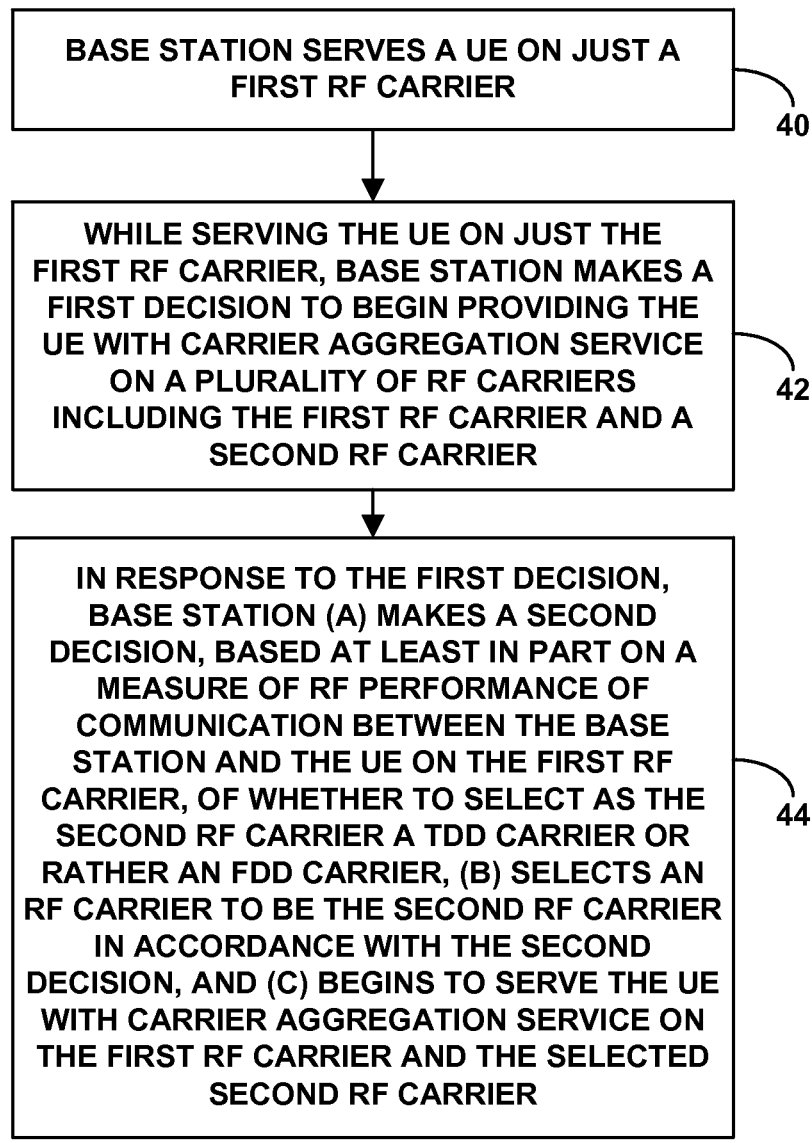
FIG. 2 is a flow chart depicting example operations in accordance with the disclosure.

FIG. 2 is next a flow chart depicting operations that can be carried out by a base station such as eNodeB 12 in accordance with the present disclosure, to help manage communication between the base station and a UE in a wireless communication system in which RF carriers are each either TDD or FDD. As shown in FIG. 2, at block 40, the method involves the base station serving the UE on just a first RF carrier. At block 42, the method the further involves, while serving the UE on just the first RF carrier, the base station making a first decision to begin providing the UE with carrier aggregation service on a plurality of RF carriers including the first RF carrier and a second RF carrier. And at block 44, the method involves, in response to the first decision, (a) the base station making a second decision, based at least in part on a measure of RF performance of communication between the base station and the UE on the first RF carrier, of whether to select as the second RF carrier a TDD carrier or rather an FDD carrier, (b) the base station selecting an RF carrier to be the second RF carrier in accordance with the second decision, and (c) the base station beginning to serve the UE with carrier aggregation service on the first RF carrier and the selected second RF carrier.

In this or other embodiments disclosed herein, the act of the base station serving the UE on just the first RF carrier may involve the base station having a radio-link layer connection (i.e., air-interface connection) with the UE on the first RF carrier so that the base station and UE can exchange signaling and bearer traffic with each other on that first RF carrier. In LTE, for instance, this may be the carrier on which the UE is attached with the eNodeB and that is thus the carrier encompassed by the UE's RRC connection.

Further, the act of the base station deciding to begin providing the UE with carrier aggregation service on a plurality of RF carriers including the first RF carrier and a second RF carrier may amount to the base station encountering a trigger to add to the available bandwidth for serving the UE by adding a carrier to the UE's radio-link layer connection. The various example triggers discussed above may apply here. For instance, the base station may decide to do this in response to detecting threshold heavy load on the current serving carrier, in response to detecting particular channel conditions on the current serving carrier, in response to determining that there is a threshold extent of data buffered for transmission between the base station and the UE, and/or in response to determining the type of content that will be communicated between the base station and the UE. As for the type of content, for instance, the base station could determine the type of content based on setup signaling indicating QoS level of the UE's bearer connection and/or based on deep packet inspection leading to a determine that the UE will be communicating a particular type of content (e.g., as indicated by Session Description Protocol signaling and/or based on the entity or entities with which the UE is communicating). Other examples are possible as well.

The act of then deciding, based at least in part on a measure of RF performance of communication between the base station and the UE on the first RF carrier, whether to select as the second RF carrier a TDD carrier or rather an FDD carrier first involves determining the measure of RF performance of communication between the base station and the UE on the first RF carrier. In practice, the base station may determine this RF performance on the first RF for the downlink and/or the uplink. As to the downlink, for instance, the base station may receive (e.g., may have recently received) one or more reports from the UE of reference signal receive power (RSRP), reference signal receive quality (RSRQ), channel state information (CSI), and/or other reports that indicate RF channel condition of the downlink on the first RF carrier (based on evaluation of downlink reference signal from the base station for instance), and the base station may roll up multiple recent such measures to establish a representative measure. As to the uplink, for instance, the base station may evaluate a sounding reference signal or other uplink communication from the UE to determine a measure of RF channel condition of the uplink, and the base station may similarly roll up multiple recent such measures to establish a representative measure. Other measures of RF performance on the first RF carrier are possible as well.

The base station may then determine whether the determined measure of RF performance of communication between the base station and the UE on the first RF carrier is below a defined threshold (e.g., a threshold defined by being programmed into the base station). For instance the threshold could be a particular level of RSRP, RSRQ, or CSI, below which the RF condition is deemed to be poor.

And the base station may then decide based on that determination whether to select as the second RF carrier a TDD carrier or rather an FDD carrier. For example, if the base station determines that the measure of RF performance of communication between the base station and the UE on the first RF carrier is not below the defined threshold, then, based at least in part on that determination, the base station may decide to select as the second RF carrier a TDD carrier, as discussed above. Whereas, if the base station determines that the measure of RF performance of communication between the base station and the UE on the first RF carrier is below the defined threshold, then, based at least in part on that determination, the base station may decide to select as the second RF carrier an FDD carrier, as discussed above. (In the example arrangement discussed above, this decision could be further based at least in part on the FDD carrier being lower frequency than the first RF carrier. In addition, as discussed above, the decision for the second RF carrier to be an FDD carrier could additionally be conditioned on a projection of path loss on the second RF carrier as compared with measured path loss on the first RF carrier, as also discussed above.)

The act of selecting the second RF carrier in accordance with the decision may then involve (i) if the decision was to select as the second RF carrier a TDD carrier, then selecting as the second RF carrier a TDD carrier, or (ii) if the decision was to select as the second RF carrier an FDD carrier, then selecting as the second RF carrier an FDD carrier. The base station may thus select the second RF carrier from those on which the base station is configured to operate In turn, the act of beginning to serve the UE with carrier aggregation service on the first RF carrier and the selected second RF carrier may involve reconfiguring the UE's radio-link layer connection to encompass both the first RF carrier and the second RF carrier. In LTE, for instance, this may involve the base station transmitting to the UE an RRC connection reconfiguration message that specifies the first RF carrier as a PCell and the selected second RF carrier as an SCell. Further, this may involve the base station updating its context record for the UE so that the base station would be prepared to provide the UE with carrier aggregation service on the first RF carrier and selected second RF carrier. And the UE may respond to the RRC connection reconfiguration message by updating its context record accordingly as well.

Figure 3:
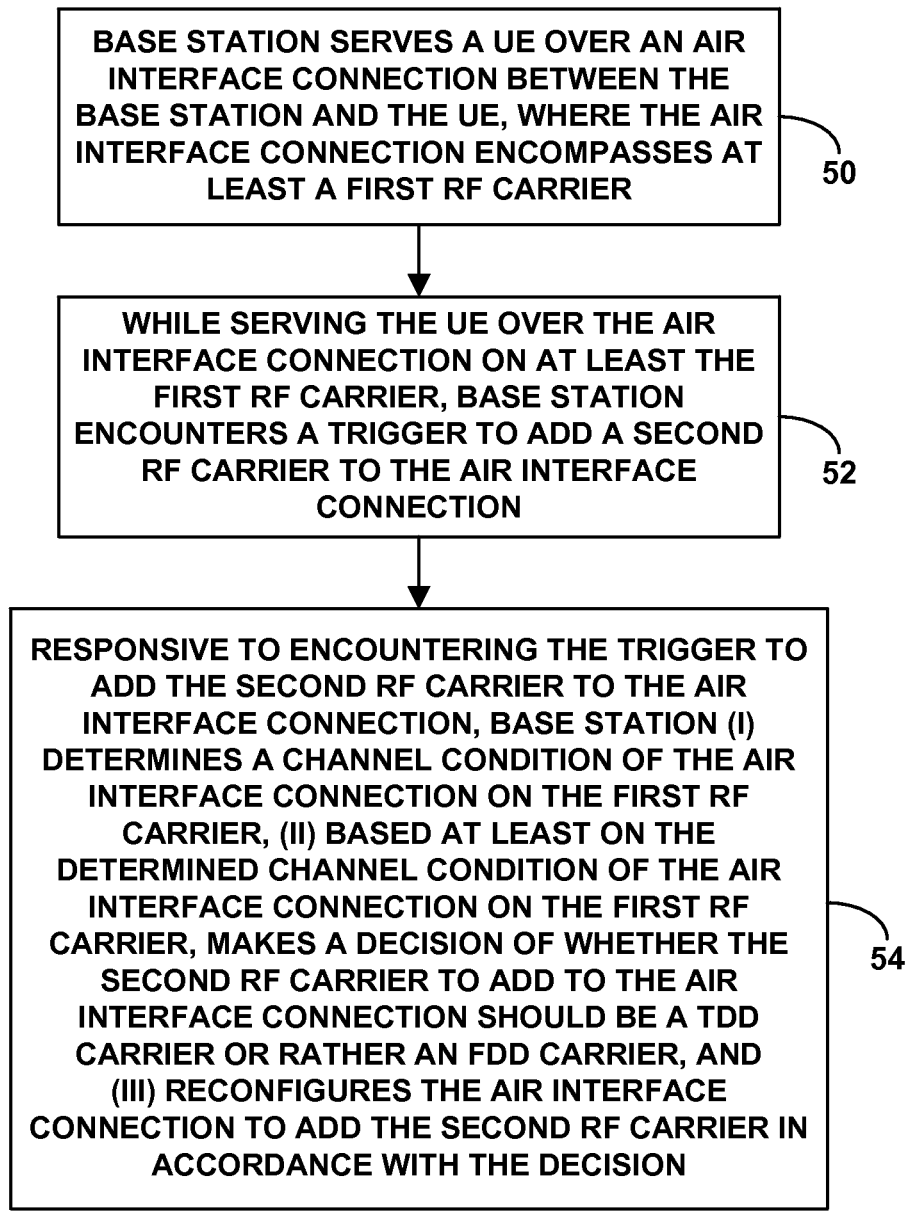
FIG. 3 is another flow chart depicting example operations in accordance with the disclosure.

FIG. 3 is next another flow chart depicting operations that can be operations that can be carried out by a base station such as eNodeB 12 in accordance with the present disclosure, to help manage communication between the base station and a UE. As shown in FIG. 3, at block 50, the method involves the base station serving the UE over an air interface connection (e.g., RRC connection) between the base station and the UE, where the air interface connection encompasses at least a first RF carrier (either as a sole serving carrier or as one (e.g., PCell) currently used in carrier aggregation service). At block 52, the method then further involves, while serving the UE over the air interface connection on at least the first RF carrier, encountering by the base station a trigger to add a second RF carrier to the air interface connection.

At block 54, the method then involves, responsive to encountering the trigger to add the second RF carrier to the air interface connection, (i) the base station determining a channel condition of the air interface connection on the first RF carrier, (ii) based at least on the determined channel condition of the air interface connection on the first RF carrier, the base station making a decision of whether the second RF carrier to add to the air interface connection should be a TDD carrier or rather an FDD carrier, and (iii) the base station reconfiguring the air interface connection to add the second RF carrier in accordance with the decision. The base station may thus then serve the UE over the air interface connection concurrently on at least the first RF carrier and second RF carrier.

Various features discussed above in connection with the flow chart of FIG. 2 may apply here as well. For instance, the act of encountering the trigger to add a second RF carrier to the air interface connection may involve various determinations as discussed above, such as determining, based at least in part on a type of content that will be transmitted between the base station and the UE, that a second RF carrier should be added to the air interface connection. Further, the act of determining a channel condition of the air interface connection on the first RF carrier may involve determining a measure of RF performance of communication between the base station and the UE on the first RF carrier.

Still further, as discussed above, the first RF carrier may be a TDD carrier, and the act of making the decision of whether the second RF carrier to add to the air interface connection should be a TDD carrier or rather an FDD carrier may involve (i) making a determination of whether the determined channel condition of the air interface connection on the first RF carrier is threshold poor and (ii) making the second decision based at least in part on the determination. Thus, the base station may decide that the second RF carrier should be a TDD carrier if the determined channel condition of the air interface connection on the first RF carrier is not threshold poor, but the base station may decide that the second RF carrier should be an FDD carrier if the determined channel condition of the air interface connection on the first RF carrier is threshold poor (possibly further based on a projection of path loss on the second RF carrier as compared with measured path loss on the first RF carrier).

Finally, FIG. 4 is a simplified block diagram of an example base station, such as an eNodeB (e.g., macro eNodeB, small cell, or other type of base station), showing some of the components that such a device may include in order to carry out these and other operations. As shown, the example base station includes a wireless communication interface 60, a network communication interface 62, and a controller 64, all of which could be integrated together in various ways or, as shown, interconnected with each other through a system bus, network, or other connection mechanism 66.

Wireless communication interface 60 includes an antenna structure (e.g., one or more antennas or antenna elements) 68, which could be tower mounted or provided in some other manner, configured to transmit and receive over the air interface, as well as a transceiver 70 and power amplifier 72, enabling the base station to serve UEs such as UE 16 over an air interface. Network communication interface 62 may then comprise one or more wired and/or wireless network interfaces (such as an Ethernet interface) through which the base station may transmit and receive data over a backhaul connection with SGW 20 as discussed above.

Controller 64, which may be integrated with wireless communication interface 60 or with one or more other components of the base station (or could be provided separate from the other base station components, possibly even in one or more other network entities), may then be configured to manage communication over the air interface, including managing communication between the base station and UE in accordance with the present disclosure. For instance, the controller may be configured to (i) while the base station is serving the UE on just a first RF carrier, make a first decision to begin providing the UE with carrier aggregation service on a plurality of RF carriers including the first RF carrier and a second RF carrier, and (ii) in response to the first decision, (a) make a second decision, based at least in part on a measure of RF performance of communication between the base station and the UE on the first RF carrier, of whether to select as the second RF carrier a TDD carrier or rather an FDD carrier, (b) select an RF carrier to be the second RF carrier in accordance with the second decision, and (c) cause the base station to begin serving the UE with carrier aggregation service on the first RF carrier and the selected second RF carrier. Further, other features discussed above, including the alternative characterization discussed in connection with FIG. 3, could be applied here as well.

Exemplary embodiments have been described above. Those skilled in the art will understand, however, that changes and modifications may be made to these embodiments without departing from the true scope and spirit of the invention. Other examples are possible as well.

What is claimed is:

1. A method of managing communication between a base station and a user equipment device (UE) in a wireless communication system wherein radio frequency (RF) carriers are each either time division duplex (TDD) or frequency division duplex (FDD), the method comprising:

serving, by the base station, the UE on just a first RF carrier;

while serving the UE on just the first RF carrier, making a first decision by the base station to begin providing the UE with carrier aggregation service on a plurality of RF carriers including the first RF carrier and a second RF carrier; and in response to the first decision, the base station (a) making a second decision, based at least in part on a measure of RF performance of communication between the base station and the UE on the first RF carrier, of whether to select as the second RF carrier a TDD carrier or rather an FDD carrier, (b) selecting an RF carrier to be the second RF carrier in accordance with the second decision, and (c) beginning to serve the UE with carrier aggregation service on the first RF carrier and the selected second RF carrier, wherein the first RF carrier is a TDD carrier, and wherein making the second decision comprises (i) determining the measure of RF performance of communication between the base station and the UE on the first RF carrier, (ii) making a determination of whether the determined measure of RF performance of communication between the base station and the UE on the first RF carrier is below a defined threshold, (iii) and making the second decision based at least in part on the determination, wherein, if the determination is that the measure of RF performance of communication between the base station and the UE on the first RF carrier is not below the threshold, then, based at least in part on the determination, the second decision is that the second RF carrier should be a TDD carrier, and wherein, if the determination is that the measure of RF performance of communication between the base station and the UE on the first RF carrier is below the threshold, then the method further comprises, responsive to the determination, making a further determination of whether projected path loss on a candidate FDD carrier is threshold lower than path loss on the first RF carrier, wherein, (i) if the further determination is affirmative, then the second decision is that the second RF carrier should be the candidate FDD carrier, but (ii) if the further determination is not affirmative, then the second decision is that the second RF carrier should be a TDD carrier.

2. The method of claim 1, wherein the measure of RF performance of communication between the base station and the UE on the first carrier comprises a measure based on UE evaluation of a downlink reference signal from the base station.

3. The method of claim 2, wherein the measure of RF performance of communication between the base station and the UE on the first RF carrier comprises a measure selected from the group consisting of (i) reference signal receive power, (ii) reference signal receive quality, and (iii) channel state information.

4. The method of claim 1, wherein making the first decision to begin providing the UE with carrier aggregation service is based at least in part on a type of content that will be transmitted between the base station and the UE.

5. The method of claim 1, wherein the base station serves the UE through an air interface connection between the base station and the UE, wherein serving the UE on just a first RF carrier comprises serving the UE when the air interface connection is defined to encompass just the first RF carrier, and wherein serving the UE with carrier aggregation service on the first RF carrier and the selected second RF carrier comprises serving the UE when the air interface connection is defined to encompass the first RF carrier and the selected second RF carrier.

6. The method of claim 5, wherein beginning to serve the UE with carrier aggregation service on the first RF carrier and the selected second RF carrier comprises reconfiguring the air interface connection to encompass the first RF carrier and the second RF carrier and then scheduling communications with the UE concurrently on both the first RF carrier and the selected second RF carrier.

7. The method of claim 6, wherein reconfiguring the air interface connection to encompass the first RF carrier and the second RF carrier comprises transmitting to the UE a Radio Resource Control (RRC) connection reconfiguration message specifying both the first RF carrier and the second RF carrier.

8. A method of managing communication between a base station and a user equipment device (UE), the method comprising:

serving, by the base station, the UE over an air interface connection between the base station and the UE, wherein the air interface connection encompasses at least a first radio frequency (RF) carrier;

while serving the UE over the air interface connection on at least the first RF carrier, encountering by the base station a trigger to add a second RF carrier to the air interface connection; and responsive to encountering the trigger to add the second RF carrier to the air interface connection, (i) determining by the base station a channel condition of the air interface connection on the first RF carrier, (ii) based at least on the determined channel condition of the air interface connection on the first RF carrier, making a decision by the base station of whether the second RF carrier to add to the air interface connection should be a time division duplex (TDD) carrier or rather a frequency division duplex (FDD) carrier, and (iii) reconfiguring by the base station the air interface connection to add the second RF carrier in accordance with the decision, whereby the base station then serves the UE over the air interface connection concurrently on at least the first RF carrier and second RF carrier, wherein the first RF carrier is a TDD carrier, and wherein making the decision comprises (i) making a determination of whether the determined channel condition of the air interface on the first RF carrier is threshold poor, (iii) and making the decision based at least in part on the determination, wherein, if the determination is that the determined channel condition of the air interface on the first RF carrier is not threshold poor, then, based at least in part on the determination, the decision is that the second RF carrier should be a TDD carrier, and wherein, if the determination is that the determined channel condition of the air interface on the first RF carrier is threshold poor, then the method further comprises, responsive to the determination, making a further determination of whether projected path loss on a candidate FDD carrier is threshold lower than path loss on the first RF carrier, wherein, (i) if the further determination is affirmative, then the decision is that the second RF carrier should be the candidate FDD carrier, but (ii) if the further determination is not affirmative, then the decision is that the second RF carrier should be a TDD carrier.

9. The method of claim 8, wherein encountering the trigger to add a second RF carrier to the air interface connection comprises determining, based at least in part on a type of content that will be transmitted between the base station and the UE, that a second RF carrier should be added to the air interface connection.

10. A base station comprising:
 a wireless communication interface for serving a user equipment device (UE) over an air interface; and
 a controller for managing communication between the base station and the UE, wherein the controller is configured to carry out operations comprising:
  while the base station is serving the UE on just a first RF carrier, making a first decision to begin providing the UE with carrier aggregation service on a plurality of RF carriers including the first RF carrier and a second RF carrier, and
  in response to the first decision, (a) making a second decision, based at least in part on a measure of RF performance of communication between the base station and the UE on the first RF carrier, of whether to select as the second RF carrier a TDD carrier or rather an FDD carrier, (b) selecting an RF carrier to be the second RF carrier in accordance with the second decision, and (c) causing the base station to begin serving the UE with carrier aggregation service on the first RF carrier and the selected second RF carrier, wherein the first RF carrier is a TDD carrier, and wherein making the second decision comprises (i) determining the measure of RF performance of communication between the base station and the UE on the first RF carrier, (ii) making a determination of whether the determined measure of RF performance of communication between the base station and the UE on the first RF carrier is below a defined threshold, (iii) and making the second decision based at least in part on the determination, wherein, if the determination is that the measure of RF performance of communication between the base station and the UE on the first RF carrier is not below the threshold, then, based at least in part on the determination, the second decision is that the second RF carrier should be a TDD carrier, and wherein, if the determination is that the measure of RF performance of communication between the base station and the UE on the first RF carrier is below the threshold, then the method further comprises, responsive to the determination, making a further determination of whether projected path loss on a candidate FDD carrier is threshold lower than path loss on the first RF carrier, wherein, (i) if the further determination is affirmative, then the second decision is that the second RF carrier should be the candidate FDD carrier, but (ii) if the further determination is not affirmative, then the second decision is that the second RF carrier should be a TDD carrier.

\* \* \* \* \*